United States Patent [19]

Sasaki

[11] Patent Number: 5,069,518
[45] Date of Patent: Dec. 3, 1991

[54] METHOD OF FABRICATING A FIBER OPTIC COUPLER

[75] Inventor: Hiroyuki Sasaki, Tokyo, Japan

[73] Assignee: Japan Aviation Electronics Industry Limited, Tokyo, Japan

[21] Appl. No.: 550,079

[22] Filed: Jul. 9, 1990

[30] Foreign Application Priority Data

Jul. 31, 1989 [JP] Japan .................................. 1-200095

[51] Int. Cl.⁵ .............................................. G02B 6/26
[52] U.S. Cl. .......................................... 385/43; 385/50
[58] Field of Search .................... 350/96.15, 96.16, 320

[56] References Cited

U.S. PATENT DOCUMENTS

| | | | |
|---|---|---|---|
| 3,957,341 | 5/1976 | Taylor | 350/96.15 |
| 4,738,511 | 4/1988 | Fling | 350/96.15 |
| 4,798,436 | 1/1989 | Mortimore | 350/96.15 |
| 4,798,438 | 1/1989 | Moore et al. | 350/96.15 |

Primary Examiner—John D. Lee
Attorney, Agent, or Firm—Pollock, Vande Sande and Priddy

[57] ABSTRACT

A method for the fabrication of a fiber optic coupler includes a step of fusing together two optical fibers along their longitudinal sections by heating them and a step of stretching the two optical fibers independently of one another with different conditions of tension and/or temperature so that the difference in their propagation constants varies. A desired splitting ratio of the fiber optic coupler can easily be achieved by making the above-said difference in propagation constant vary in the stretching step.

4 Claims, 4 Drawing Sheets

PRIOR ART
FIG. 1A
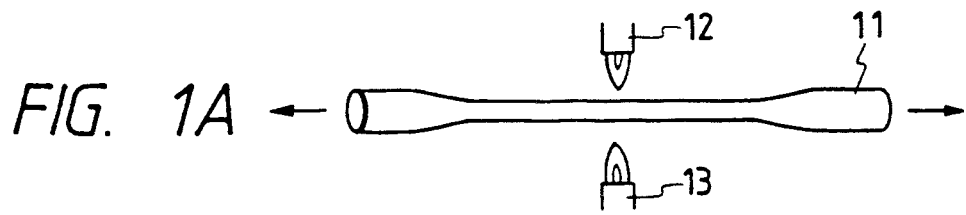
FIG. 1B
FIG. 1C
FIG. 1D
FIG. 2
PRIOR ART
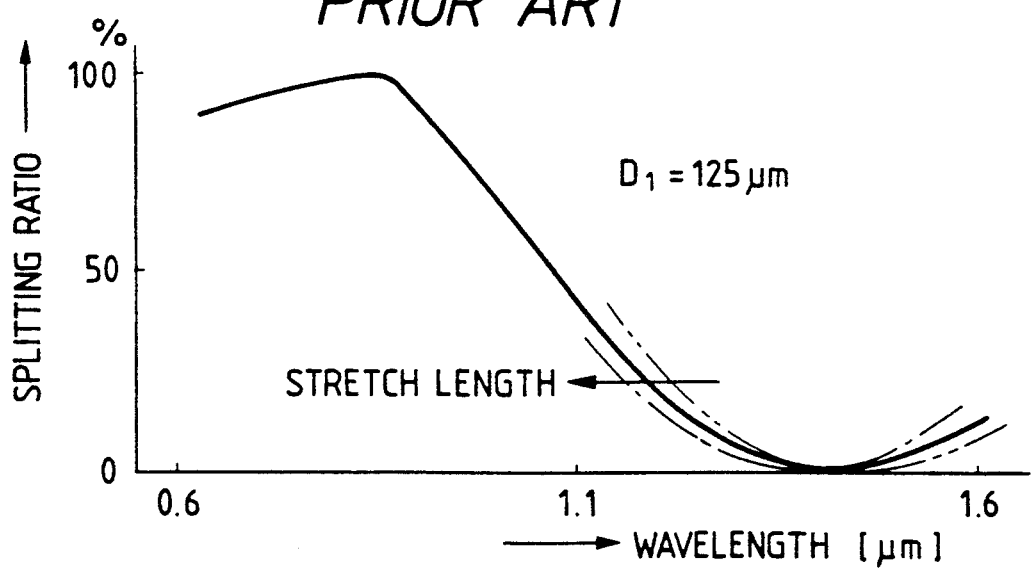

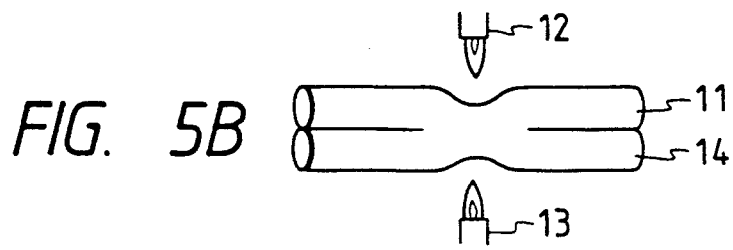
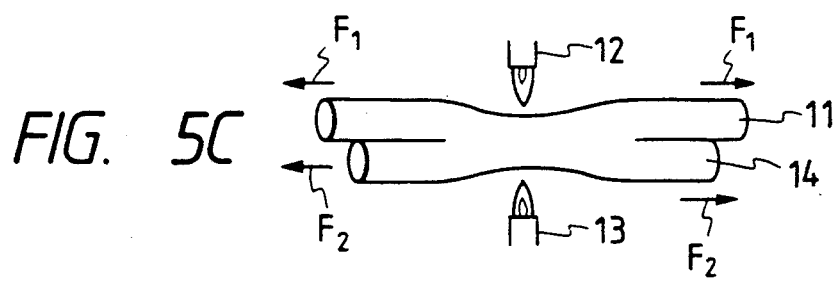
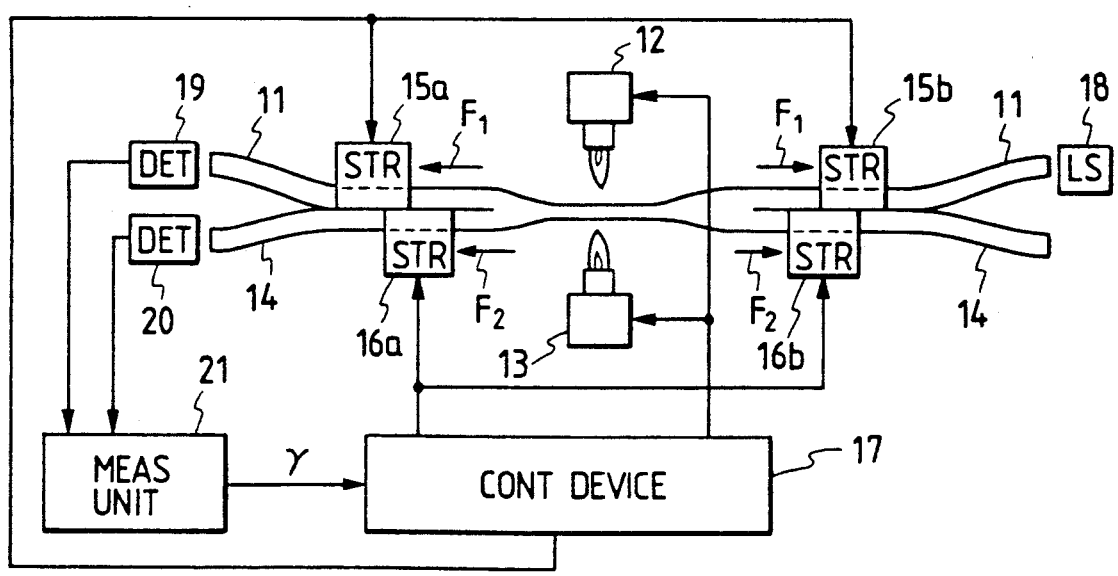

METHOD OF FABRICATING A FIBER OPTIC COUPLER

BACKGROUND OF THE INVENTION

The present invention relates to a method of fabricating a fiber optic coupler by fusion stretching techniques.

According to a conventional method employing fusion stretching techniques, a fiber optic coupler having a desired splitting ratio at a specified wavelength is produced by fusion stretching two optical fibers of the same propagation constant, but the splitting ratio of such a fiber optic coupler has substantial wavelength dependence. It is therefore difficult, with the prior art method, to fabricate a fiber optic coupler having a splitting ratio over a desired wide wavelength range. One method that has been proposed to solve this problem by fusion stretching two optical fibers of different propagation constants is disclosed in, for example, U.S. Pat. No. 4,798,438. With reference to its fabrication process shown in FIG. 1 the conventional method, comprises the steps of:

(A) Providing two optical fibers 11 and 14 of the same diameter and the same propagation constant, cut off from the same optical fiber, and heating the optical fiber 11 along its longitudinal segment by burners 12 and 13 while stretching the optical fiber 11 in opposite directions to reduce the diameter of the longitudinal segment to thereby change its propagation constant;

(B) Holding the thus stretched optical fiber 11 and the other fiber 14 in parallel juxtaposition with each other;

(C) Fusing together the optical fibers 11 and 14 along their longitudinal sections by the burners 12 and 13; and (D) Stretching the optical fibers 11 and 14 by applying thereto equal tension.

FIGS. 2 through 4 show the wavelength vs. splitting ratio characteristics of fiber optic couplers 15 fabricated according to the conventional method, using optical fibers 125 μm in outer diameter before they were stretched.

The splitting ratio of the fiber optic coupler is defined as follows:

Splitting ratio $= P_4/(P_1 + P_4) \times 100 (\%)$ where $P_1$ and $P_4$ are energies of light emitted from one end of, for example, the optical fiber 14 supplied at the other end with light and from one end of the other optical fiber 11 on the same side as the above-said one end of the fiber 14.

FIG. 2 shows the case of a fiber optic coupler produced by fusing together and stretching the optical fibers 11 and 14 of the same diameter without involving step A. As seen from FIG. 2, the splitting ratio of this fiber optic coupler is zero at a specific wavelength. By increasing the stretching length in step D, the wavelength characteristic of the splitting ratio is shifted toward the short wavelength side as indicated by the arrow. This property is common to the cases of FIGS. 3 and 4.

FIG. 3 shows the case of a fiber optic coupler fabricated involving step A in which the optical fiber 11 was stretched to reduce the outer diameter $D_1$ of its longitudinal section to 96 μm. A minimum value of the splitting ratio is 13% in this example.

FIG. 4 shows the case of a fiber optic coupler fabricated involving step A in which the optical fiber 11 was stretched to reduce the outer diameter $D_1$ of its longitudinal section to 84 μm. A minimum value of the splitting ratio is 64% in this example.

By stretching the one optical fiber 11 in step A to make its propagation constant different from that of the other optical fiber 14 as mentioned above, it is possible to fabricate a fiber optic coupler whose splitting ratio has a desired value, and the splitting ratio undergoes no substantial change with wavelength in the vicinity of the wavelength at which the splitting ratio is minimum, and consequently, a relatively wide-band fiber optic coupler can be implemented. In addition, the center wavelength at which the splitting ratio is minimum can be shifted by changing the amount the fiber is stretched in step D. Further, the fact that in each case of FIGS. 2, 3 and 4 the minimum splitting ratio remains substantially constant in spite of increased stretching length in step D suggests that the difference in propagation constant between the two optical fibers 11 and 14 is kept substantially constant.

Comparison of FIGS. 3 and 4 reveals that the minimum value of the splitting ratio will markedly change from 13% to 64% even with a slight change in the outer diameter of the optical fiber 11 in step A. In the case of manufacturing a fiber optic coupler whose splitting ratio has a minimum value as close to 50% as possible at wavelengths in the range of 1.1 to 1.6 μm, the outer diameter $D_1$ of the optical fiber 11 in step A must be selected a little greater than 84 μm.

With the above-described conventional manufacturing method, the minimum value of the splitting ratio of the fiber optic coupler depends essentially upon the outer diameter of the reduced-diameter section produced by stretching the longitudinal section of the one optical fiber 11 in step A. However, the outer diameter of the reduced-diameter section scatters considerably among specimens, and even if the stretching length or time is adjusted in step D, the splitting ratio is merely shifted toward the axis of wavelength, so that the minimum value of the splitting ratio cannot be controlled. On this account, the minimum value of the splitting ratio of the fiber optic coupler scatters largely, resulting in the yield rate of product being very low.

SUMMARY OF THE INVENTION

It is therefore an object of the present invention to provide a method by which a wide-band fiber optic coupler of a desired splitting ratio can be fabricated with a high yield rate.

The fiber optic coupler fabrication method of the present invention includes steps of fusing together two optical fibers along their longitudinal sections, and stretching the two optical fibers independently of each other with different conditions so that the difference between their propagation constants varies.

It is desirable that the difference in the propagation constant between the two optical fibers fused together be varied by applying thereto different tension.

BRIEF DESCRIPTION OF THE DRAWINGS

FIG. 1(A, B, C, and D) is a diagram showing a sequence of steps involved in the fabrication of a conventional fiber optic coupler;

FIG. 2 is a graph showing a wavelength vs. splitting ratio characteristic of a fiber optic coupler produced by fusing together two optical fibers of the same outer diameter and then stretching them by the same tension;

FIG. 5(A, B, C) is a diagram illustrating a sequence of steps involved in the fabrication of a fiber optic coupler according to the present invention;

FIG. 6 is a block diagram illustrating an apparatus for the fabrication of the fiber optic coupler according to the present invention;

DESCRIPTION OF THE PREFERRED EMBODIMENT

Figure 3:
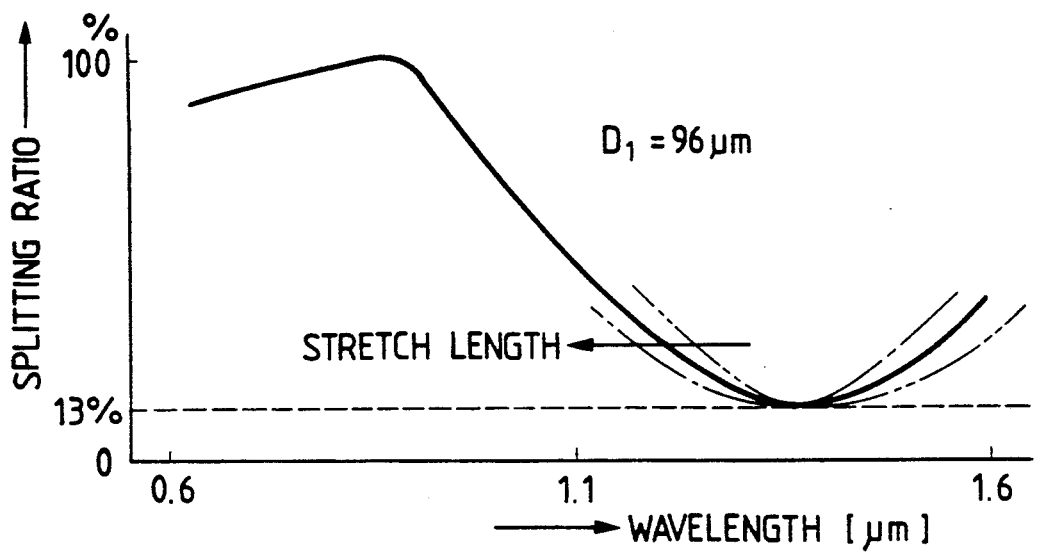
FIG. 3 is a graph showing a wavelength vs. splitting ratio characteristic of a fiber optic coupler obtained when the one optical fiber was stretched to reduce its outer diameter to 96 μm in step A of the conventional fabrication method.
Figure 4:
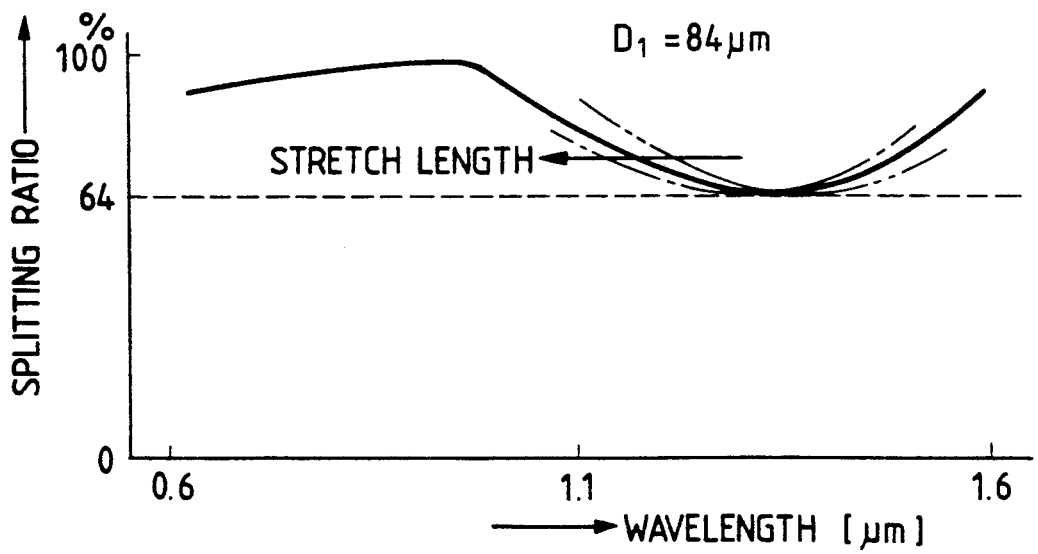
FIG. 4 is a graph showing the wavelength vs. splitting ratio characteristic of a fiber optic coupler obtained when the one optical fiber was stretched to reduce its outer diamter to 84 μm in step A of the conventional fabrication method.

Referring now to FIGS. 5 and 6, an embodiment of the present invention will hereinafter be described in the order of fabrication process. In FIG. 5 and 6 the parts corresponding to those in FIG. 1 are identified by the same reference numerals.

Step A; The optical fibers 11 and 14 of the same diameter are positioned in parallel juxtaposition with each other (FIG. 5A).

Step B: As shown in FIG. 6, the optical fibers 11 and 14 are fixed at both ends to stretchers 15a, 15b and 16a, 16b, respectively, and are fused together over their central portions by heating with the burners 12 and 13 under control of a control device 17 (FIG. 5B).

Step C: The optical fibers 11 and 14 are thus heated and, at the same time, they are stretched lengthwise thereof with different magnitudes of tension, $F_1$ and $F_2$ (where $F_1 > F_2$), respectively, by the stretchers 15a, 15b and 16a, 16b also placed under control of the control device 17 (FIG. 5C). In this process, as shown in FIG. 6, light of a predetermined wavelength, emitted from a light source 18, is applied to the optical fiber 11 at one end thereof and light emanating from end faces of the optical fibers 11 and 14 on the side opposite from the above-mentioned one end of the fiber 11 are detected by photodetectors 19 and 20. The detected outputs are applied to a splitting ratio measuring unit 21 for measuring the splitting ratio and its measured value $\gamma$ is provided to the control device 17. The control device 17 compares the measured value $\gamma$ and a preset value $\gamma_0$ (50%, for instance) and, when detecting that their difference becomes smaller than a predetermined value, immediately stops the stretchers 15a, 15b and 16a, 16b from their stretching oparation and turns OFF the burners 12 and 13.

By stretching the optical fibers 11 and 14 with different magnitudes of tension, the difference in propagation constant between them varies accordingly.

Figure 7:
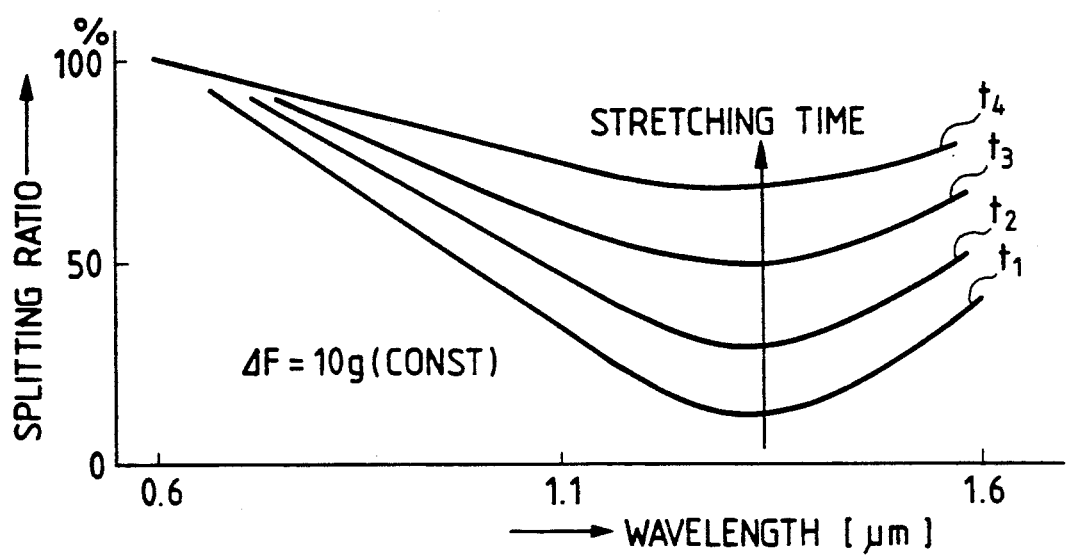
FIG. 7 is a graph showing the wavelength vs. splitting ratio characteristic of the fiber optic coupler, with the tension difference held constant and the stretching time used as a parameter.

FIG. 7 shows the wavelength vs. splitting ratio characteristic using, as a parameter, the stretching time t in the case where the tension difference $\Delta F = F_1 - F_2$ was set to 10 g in step C. It is seen from FIG. 7 that the minimum value of the splitting ratio increases with time and varies over a wide range.

Figure 8:
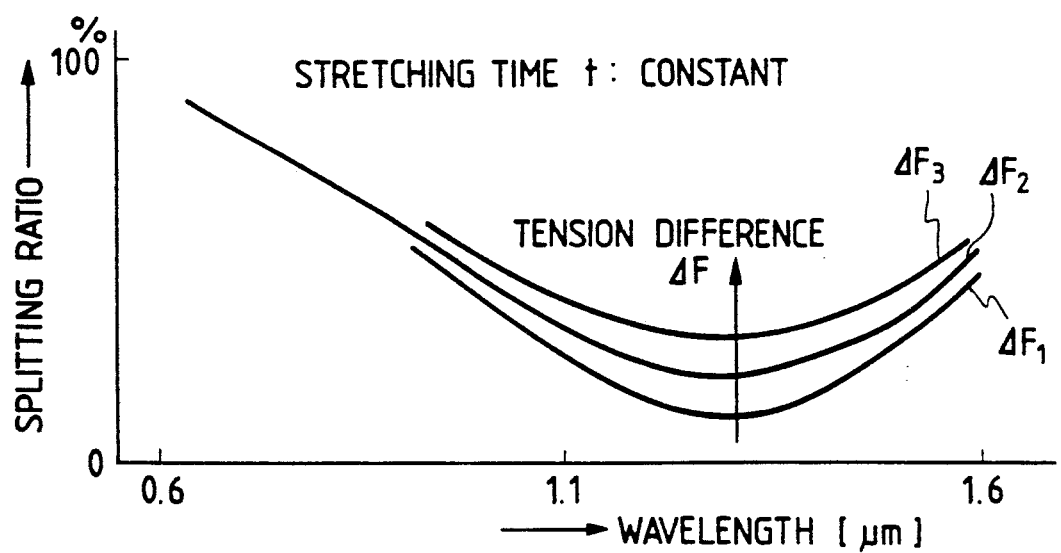
FIG. 8 is a graph showing the wavelength vs. splitting ratio characteristic of the fiber optic coupler, with the stretching time held constant and the tension difference used as a parameter.

By increasing the tension difference $\Delta F$ while leaving the stretching time t constant step C, the minimum value of the splitting ratio increases as shown in FIG. 8. Thus the tension difference $\Delta F$ is important but the magnitude of tension itself is not so important.

While in the above the two optical fibers 11 and 14 to be held in parallel juxtaposition with each other in step A are shown to be equal in outer diameter, they may also be of different outer diameters. Further, the two optical fibers 11 and 14 may be disposed across each other.

In step C the optical fibers are described above to be continuously stretched until the difference between the measured value $\gamma$ and the preset value $\gamma_0$ of the splitting ratio becomes smaller than a predetermined value in step C, but it is also possible to repeat the stretching of the optical fibers and the measurement of the splitting ratio until the abovementioned difference becomes smaller than the predetermined value. Moreover, it is also possible to include in step C a process of stretching the optical fibers with no tension difference before, after or in the middle of the step of stretching them with different magnitudes of tension.

Although in the above the two optical fibers 11 and 14 are described to be stretched with different magnitudes of tension in step C, the same results as mentioned above would also be obtainable by stretching them with the same tension while heating the optical fiber 11 and the optical fiber 14 at different temperatures by the burners 12 and 13. Also in this instance, the difference in propagation constant between the optical fibers 11 and 14 varies as in the case where they are stretched with different magnitudes of tension. The important point is to stretch the two optical fibers in such a manner that the difference between their propagation constants varies. It must be noted here that when the two optical fibers 11 and 14 are stretched with the different magnitudes of tension, $F_1$ and $F_2$, as shown in FIG. 5C, the amounts the two optical fibers are stretched do not always differ but that they could be stretched substantially the same length by a suitable selection of the lengths of their heated sections or heating temperature. Conversely, they can also be stretched different lengths, using the same tension.

While in the above two optical fibers are fused together and stretched, three or more optical fibers can similarly be employed to form a fiber optic coupler.

As described above, according to the present invention, two optical fibers are stretched so that the difference in their propagation constant varies, by which the splitting ratio of the fiber optic coupler can easily be varied over a wide range with an increase in the stretching time. Furthermore, by stopping the stretching of the optical fibers when the splitting ratio has approached sufficiently close to a preset value, a deviation of the splitting ratio from the preset value can regularly be made far smaller than in the prior art. Thus the production yield of fiber optic couplers can be improved markedly.

According to the present invention, since there is not necessarily needed for prestretching the one optical fiber to make its propagation constant different from that of the other optical fiber, that is, since step A needed in the prior art is not necessarily involved, the number of fabrication steps involved is reduced accordingly; hence low-cost fiber optic couplers can be offered.

It will be apparent that many modifications and variations may be effected without departing from the scope of the novel concepts of the present invention.

What is claimed is:

1. A method of fabricating a fiber optic coupler, comprising the steps of;
   fusing together at least two optical fibers along their longitudinal sections by heating; and
   stretching said fused optical fibers independently of one another with different conditions so that the difference in their propagation constants varies.

2. The method of claim 1, wherein said stretching step includes a step of stretching said two optical fibers with different magnitudes of tension.

3. The method of claim 1, wherein said stretching step includes a step of heating said two optical fibers at different temperatures.

4. The method of claim 1, 2 or 3 further including the steps of: measuring a splitting ratio of said fiber optic coupler by applying light of a predetermined wavelength to one end of one of said two optical fibers after said fibers have been fused together; and comparing said measured splitting ratio and a preset value and, when the difference therebetween is smaller than a predetermined value, stopping said stretching and heating of said two optical fibers.

* * * * *